United States Patent
Murakami et al.

(10) Patent No.: US 6,682,306 B2
(45) Date of Patent: Jan. 27, 2004

(54) MOVING BLADES FOR STEAM TURBINE

(75) Inventors: Itaru Murakami, Tokyo-To (JP); Toshio Suzuki, Zushi (JP); Kenichi Okuno, Yokohama (JP); Ryou Oda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/230,147

(22) Filed: Aug. 29, 2002

(65) Prior Publication Data

US 2003/0049131 A1 Mar. 13, 2003

(30) Foreign Application Priority Data

Aug. 30, 2001 (JP) ......................................... 2001-261147

(51) Int. Cl.$^7$ ................................................. F01D 5/14
(52) U.S. Cl. ................... 416/189; 416/195; 416/196 R; 416/243; 416/223 A
(58) Field of Search ................................ 416/189, 194, 416/195, 196 R, 223 A, DIG. 2, 243

(56) References Cited

U.S. PATENT DOCUMENTS 5,160,242 A * 11/1992 Brown .................... 416/193 A
5,299,915 A * 4/1994 Dinh et al. .............. 416/223 A
6,474,948 B1 * 11/2002 Pirolla et al. ................ 416/243

FOREIGN PATENT DOCUMENTS

JP         2000-274201         10/2000

* cited by examiner

Primary Examiner—Ninh H. Nguyen
(74) Attorney, Agent, or Firm—Foley & Lardner

(57) ABSTRACT

The moving blades are configured so as to meet a condition: $(L+3D) \times f \geq 14{,}500$ or $L \times (L+D) \times f^2 \geq 1.55 \times 10^7$, where L is an effective length of the moving blade measured in inches, D is a blade root circle diameter of the moving blades measured in inches, and f is the rated operating speed of the turbine measured in Hz. The moving blades are formed of a titanium alloy. The dovetail has an Christmas-tree shape, and is a curved-axial-entry. The moving blades are configured and arranged so as to meet a condition: $3.5 \leq P/W \leq 7.0$ or $0.8 \leq P/C \leq 1.0$, where W is a width of a section of a tip of the moving blade measured along an axis of the rotor wheel, P is pitch of the moving blades, and C is a chord length of the tip section of the moving blade. Adjacent moving blades are connected to each other in such a manner that the adjacent moving blades being capable of relative movement while the adjacent moving blades being connected to each other.

12 Claims, 10 Drawing Sheets

MOVING BLADES FOR STEAM TURBINE

BACKGROUND OF THE INVENTION

1. Field of the Invention

The present invention relates to a steam turbine for a thermal power plant and, more particularly to moving blades for such a steam turbine.

2. Description of the Related Art

As is generally known, increase in the annulus area of the final-stage moving blades of a steam turbine is essential to increase the capacity of the steam turbine. FIGS. 1 and 2 show the relation between the annulus area for one flow of the final-stage moving blades of a 50/60 Hz tandem compound steam turbine and the range of possible output. FIG. 3 shows the relation between the annulus area for one flow of the final-stage moving blades of a 60 Hz combined-cycle single-casing steam turbine and the range of possible output. In FIGS. 1, 2 and 3, straight lines A indicate possible maximum outputs, and straight lines B indicate possible minimum outputs. As obvious from FIGS. 1 to 3, the necessary annulus area of the final-stage moving blades increases with the increase of output. The maximum annulus area of a well-known final-stage moving blades of a 60 Hz steam turbine is on the order of 8.7 m$^2$ as shown in FIG. 1, and that of a 50 Hz steam turbine is on the order of 14.6 m$^2$ as shown in FIG. 2. Therefore, the possible maximum output of a 60 Hz tandem compound steam turbine is about 1000 MW and that of a 50 Hz tandem compound steam turbine is about 900 MW. The possible maximum output of a steam turbine for a 60 Hz combined-cycle plant is 90 MW. If the output exceeds the possible maximum output, the velocity of the exhaust of the turbine increases, increasing exhaust loss accordingly.

The final-stage moving blades of a 1200 MW class 60 Hz tandem compound steam turbine or a steam turbine for a 400 MW class 60 Hz single-flow combined-cycle plant (with 130 MW class steam turbine) need an annulus area of 9.6 m$^2$ or above as shown in FIGS. 1 and 3. The final-stage moving blades of a 1000 MW class 50 Hz tandem compound steam turbine needs an annulus area of 15.4 m$^2$ as shown in FIG. 2. However, no conventional final-stage moving blades meet such a condition and hence a steam turbine having such a large capacity has not been achieved.

Recently, titanium alloys have widely been used as materials for aircraft structural members, building structural members, sports gear, frames of spectacles and such, and the demand/supply ratio of titanium alloys has increased. However, steels, such as a 12-Cr chromium steel, is superior to titanium alloys in respect of stability of supply and cost. Steels are superior to titanium alloys also in reliability based on the previous results of practical use. Although the final-stage moving blades need an annulus area of 11.5 m$^2$ at the least to reconstruct a 600 MW low-pressure single-casing steam turbine, such a final-stage moving blade cannot be realized by conventional techniques, and hence a high-performance 600 MW class tandem compound low-pressure single-casing steam turbine cannot be realized.

Stresses induced in the moving blade due to the centrifugal force and vibrations acting on the moving blade are difficulties that make the realization of such a high-performance steam turbine impossible. The final-stage moving blades must have a long length and/or must be arranged in a large blade root circle diameter to increase the annulus area. However, such a moving blade increases centrifugal forces that act on an effective blade part, a dovetail and a rotor bore, and stresses induced in various parts of the moving blade increase accordingly beyond the material strength of the moving blade.

Problems that arise when the length of the moving blade is increased to increase the annulus area include the vibration of the moving blade. The rotation of a rotor wheel and the flow of steam passing between the moving blades generate vibrations in the moving blade of a steam turbine. The amplitude of vibrations corresponding to a stress induced in the moving blade increases with the increase of the length of the moving blade or with increase of the flow of steam. Thus, vibration-reducing techniques are very important to develop a moving blade for the final-stage of a large-capacity steam turbine.

Final-stage moving blades having an annulus area greater than that of conventional final-stage moving blades are needed to cope with the recent need for a large-capacity, compact steam turbine. However, restrictions set by centrifugal-force related stress or vibration related stress hinder the current techniques from providing a final-stage moving blade suitable for such a large-capacity, compact steam turbine.

SUMMARY OF THE INVENTION

Accordingly, it is an object of the present invention to provide moving blades, specifically final-stage moving blades, having a large annulus area for a low-pressure turbine stage.

Specifically, the present invention is directed to: final-stage moving blades having an annulus area exceeding 9.6 m$^2$ for one flow for a 60 HZ steam turbine; moving blades having an annulus area exceeding 15.4 m$^7$ for one flow for a 50 Hz steam turbine; or moving blades of a steel having an annulus area exceeding 11.5 m$^2$ for one flow for a 50 Hz steam turbine.

The second object of the present invention is to provide a moving blade having a shape capable of preventing the induction of the centrifugal-forth related and vibration related stresses exceeding the allowable strength of the material of the moving blade in the moving blade even if the moving blade has an increased length and arranged in an increased blade root circle diameter.

The third object of the present invention is to provide moving blades for a turbine, having an excellent vibration-damping characteristic capable of damping vibrations generated therein while the turbine is in operation.

To achieve the above objectives, the present invention provides a moving blade assembly for a stage of a low-pressure steam turbine having a raced operating speed of 50 Hz or 60 Hz. The assembly includes a rotor wheel having dovetail slots; and a plurality of moving blades secured to the rotor wheel and arranged as an annular array circumferentially around the rotor wheel, each of the moving blades having dovetails inserted into each of the dovetail slots of the rotor wheel.

The features of the arrangement of the moving blades are as follows: the moving blades are configured so as to meet a condition: $(L+3D) \times f \geq 14{,}500$ or $L \times (L+D) \times f^2 \geq 1.55 \times 10^7$, where L is an effective length of the moving blade measured in inches, D is a blade root circle diameter of the moving blades measured in inches, and f is the rated operating speed of the turbine measured in Hz; the moving blades are formed of a titanium alloy; each of the dovetails has an Christmas-tree shape and is a curved-axial-entry; the moving blades are configured and arranged so as to meet a condition: $3.5 \leq P/W \leq 7.0$ or $0.8 \leq P/C \leq 1.01$, where W is a width of a tip of the moving blade measured along an axial direction of the rotor wheel, P is a pitch of the moving blades measured at the tips of the moving blades and C is a chord length measured at the tip of the moving blade; and all adjacent moving blades of said plurality of moving blades are connected to each other in such a manner that the adjacent moving blades being capable of relative movement with the adjacent moving blades being connected to each other.

If the moving blades meet a condition; $L \times f \geq 2400$, the moving blades are preferably formed of an $\alpha+\beta$-type titanium alloy.

If the moving blades meet a condition: $L \times f \geq 2700$, the moving blades are preferably formed of a near-$\beta$-type titanium alloy.

In the event that the moving blades are configured so as to meet conditions: $1.45 \times 10^4 \geq (L+3D) \times f \geq 1.3 \times 10^4$ and $L \times (L+D) \times f^2 < 1.55 \times 10^7$, the moving blades may be formed of a martensitic stainless steel having a Cr content in a range of 10 to 18 wt % instead of said titanium alloy.

In a specific embodiment, each of the moving blades has a snubber cover formed integrally with the moving blade; and the adjacent moving blades are connected to each other by contacting the snubber covers of the adjacent moving blades to each other in such a manner that the adjacent snubber covers are capable of relative movement while the adjacent snubber covers contacting to each other, and that the moving blades form a continuous ring around the rotor wheel.

In a specific embodiment, each of the moving blades has a lug formed integrally with the moving blade at a middle portion of an effective part of the moving blade; the adjacent moving blades are connected to each other by a lug-and-sleeve connection including a sleeve and the lug engaged with the sleeve, the connection allowing relative movement between the lug and the sleeve; and the lugs and the sleeves form a continuous ring around the rotor wheel.

Preferably, the moving blade has no through holes formed therein.

It is preferable that the dovetail of each of the moving blades is configured so as to meet a condition: $0.8 < R/Wr < 1.2$, where R is a radius of a center line of the dovetail as viewed from a radial direction of the rotor wheel, and Wr is a width of the dovetail measured along the axial direction of the rotor wheel.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
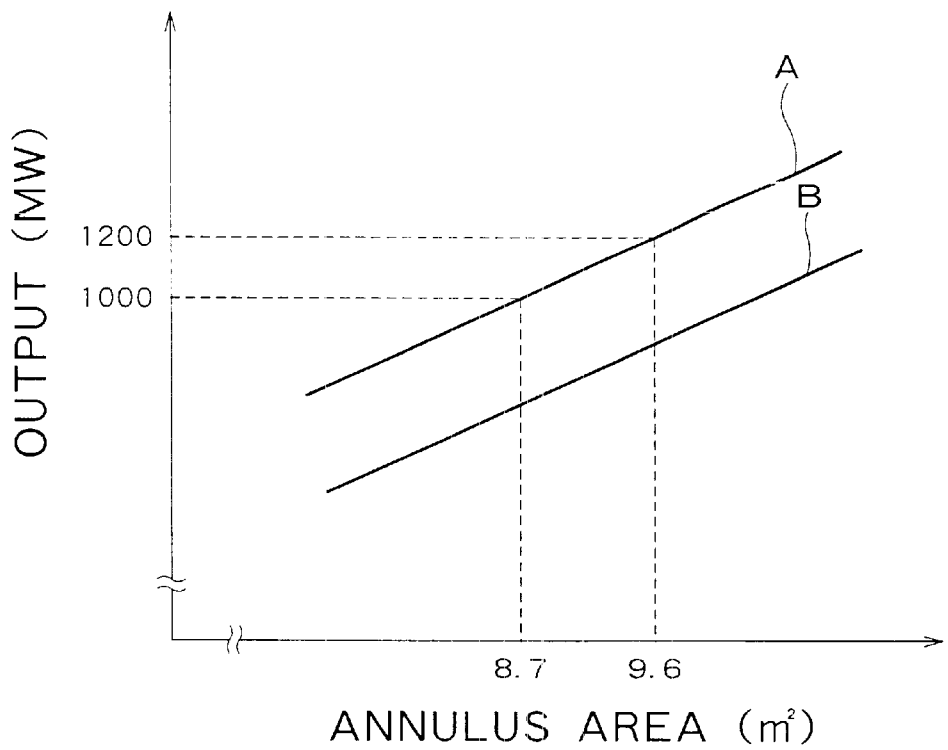
FIG. 1 is a graph showing the relation between the annulus area for one flow of final-stage moving blades of a 60 Hz tandem compound steam turbine and the range of possible output.
Figure 2:
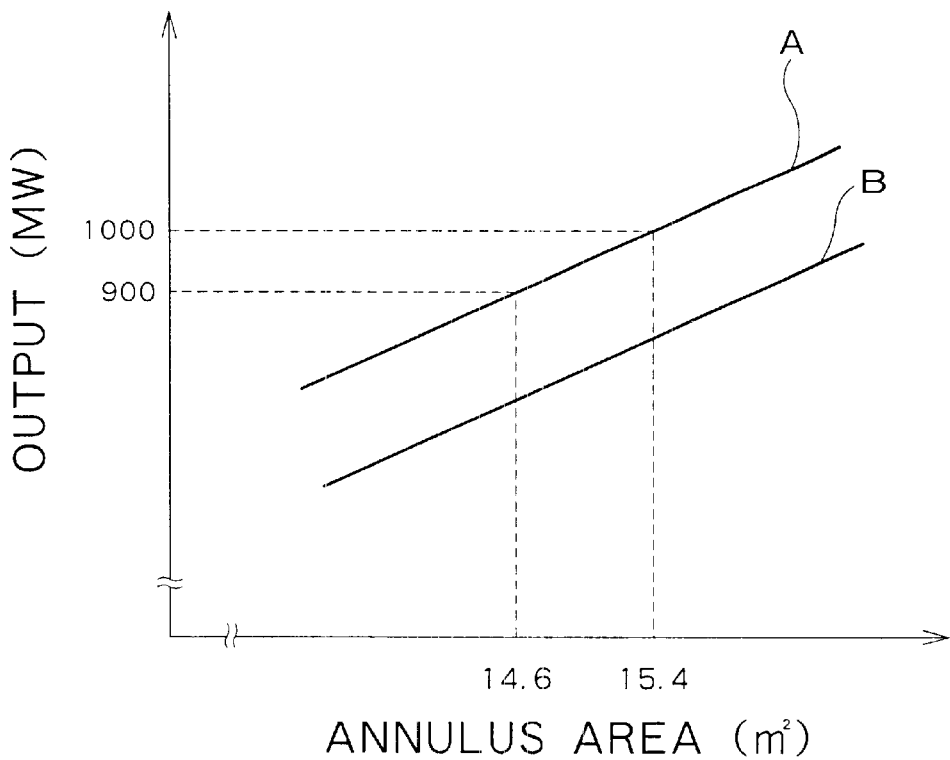
FIG. 2 is a graph showing the relation between the annulus area for one flow of final-stage moving blades of a 50 Hz tandem compound steam turbine and the range of possible output.
Figure 3:
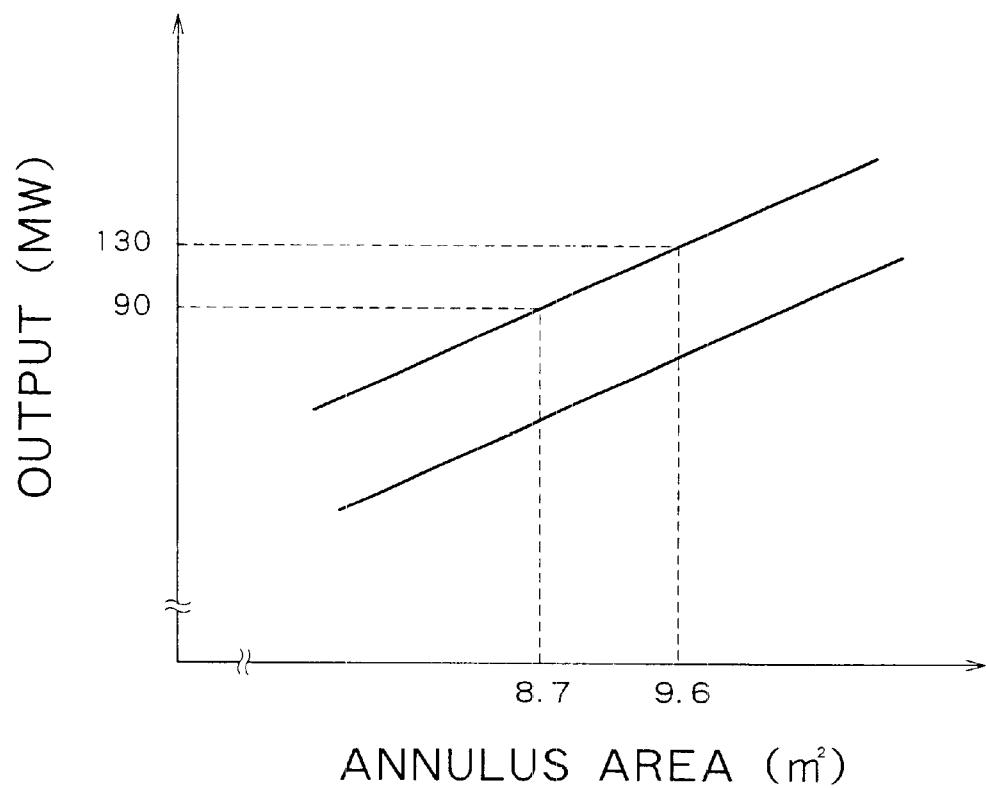
FIG. 3 is a graph showing the relation between the annulus area for one flow of final-stage moving blades of a 60 Hz combined-cycle single-casing tandem compound steam turbine and the range of possible output.
Figure 4A:
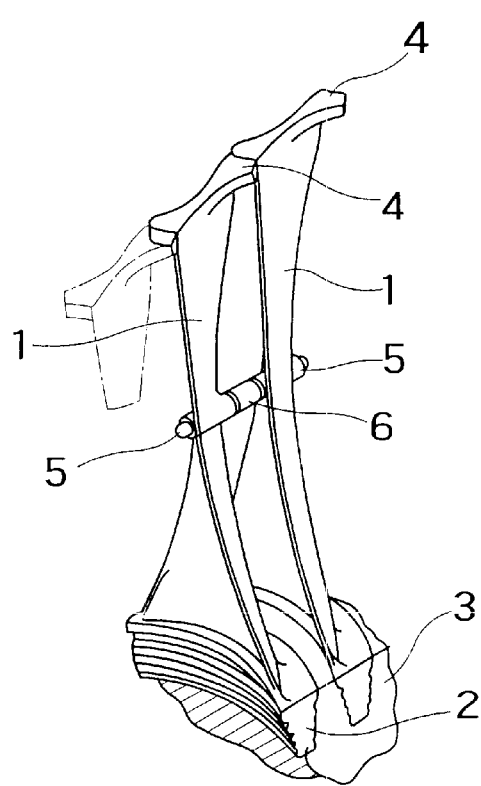
FIG. 4A is a perspective view of a moving blade in a preferred embodiment according to the present invention for a steam turbine.
Figure 4B:
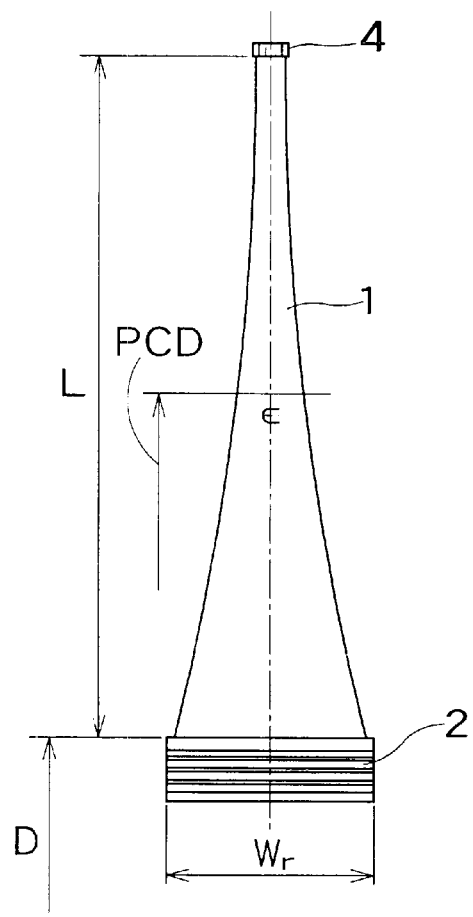
FIG. 4B is a front elevation of the moving blade of FIG. 4A as viewed from the circumferential direction of the rotor wheel.

FIGS. 4A and 4B show a moving blade assembly in a preferred embodiment according to the present invention in a perspective view and a front elevation, respectively. The assembly has a rotor wheel 3 and a plurality of moving blades 1 mounted to the rotor wheel 3. The moving blades 1, only two of them being shown in FIG. 4A, are arranged as an annular array circumferentially around the rotor wheel 3. The moving blade 1 has a dovetail 2 of a curved-axial-entry-Christmas-tree design. Formed in the rotor wheel 3 are a plurality of dovetail slots, into each of which each dovetail 2 is inserted.

A snubber cover 4 is formed integrally with the moving blade 1 at a tip part of the moving blade 1. Each of the snubber cover 4 has opposite end faces. The end face of the snubber cover 4 of each moving blade 1 abuts on the end face of the snubber cover 4 of the adjacent moving blade 1 as shown in FIG. 4, so that the snubber covers 4 form a continuous ring about an axis of the rotor wheel 3. The abutting end faces of the snubber covers 4 are capable of relative sliding movement with the abutting end faces contacting to each other.

Lugs 5 project respectively from opposite sides of a middle part of an effective part of each moving blade 1. The lugs 5 are formed integrally with the moving blade 1. The opposing lugs 5 of the adjacent moving blades 1 are inserted into a sleeve 6 to form a lug-and-sleeve connection connecting the adjacent moving blades 1 to each other. The lugs 5 and the sleeves 6 form a continuous ring about an axis of the rotor wheel 3. The lug 5 and the sleeve 6 are capable of relative movement with the lug 5 being inserted into the sleeve 6.

It should be noted that, in this specification, the expression "one or more member (e.g., the snubber cover and the lug) is formed integrally with the moving blade" means that the member and the moving blade have a unitary and monolithic structure. In other words, the above expression excludes the case in which the member(s) (e.g., the snubber cover and the lug) formed separately is joined to the main portion of the moving blade. In a typical embodiment, the snubber cover 4 and the lug 5 (and the dovetail 3) are forged together with the blade portion of the moving blade 1 at one time, and are shaped to be in respective final shapes, by a suitable machining and/or grinding process.

The annulus area A of moving blades is calculated by using the expression: $A=\pi \times L \times (L+D)$, where L is the length of the effective part of the moving blade 1 (hereinafter referred to as "blade length"), and D is the blade root circle diameter, i.e., the diameter of a circle including the roots of the moving blades 1 mounted on the rotor wheel 3. Thus, the annulus area A can be increased by increasing the blade length L, the blade root circle diameter D or both the blade length L and the blade root circle diameter D.

Increase in the blade length L or the blade root circle diameter D involves increase in centrifugal force acting on the moving blade and the rotor wheel. More specifically, the stress induced in the moving blade 1 is substantially proportional to $L \times (L+D)$ and the square of rotational frequency f, and the rotor bore stress is substantially proportional to L+3D and rotational frequency f. The stress induced in the moving blade 1 or the rotor bore stress must not higher than the strength of the material, and hence there are limitations to the material and structure of the moving blade 1.

Figure 5:
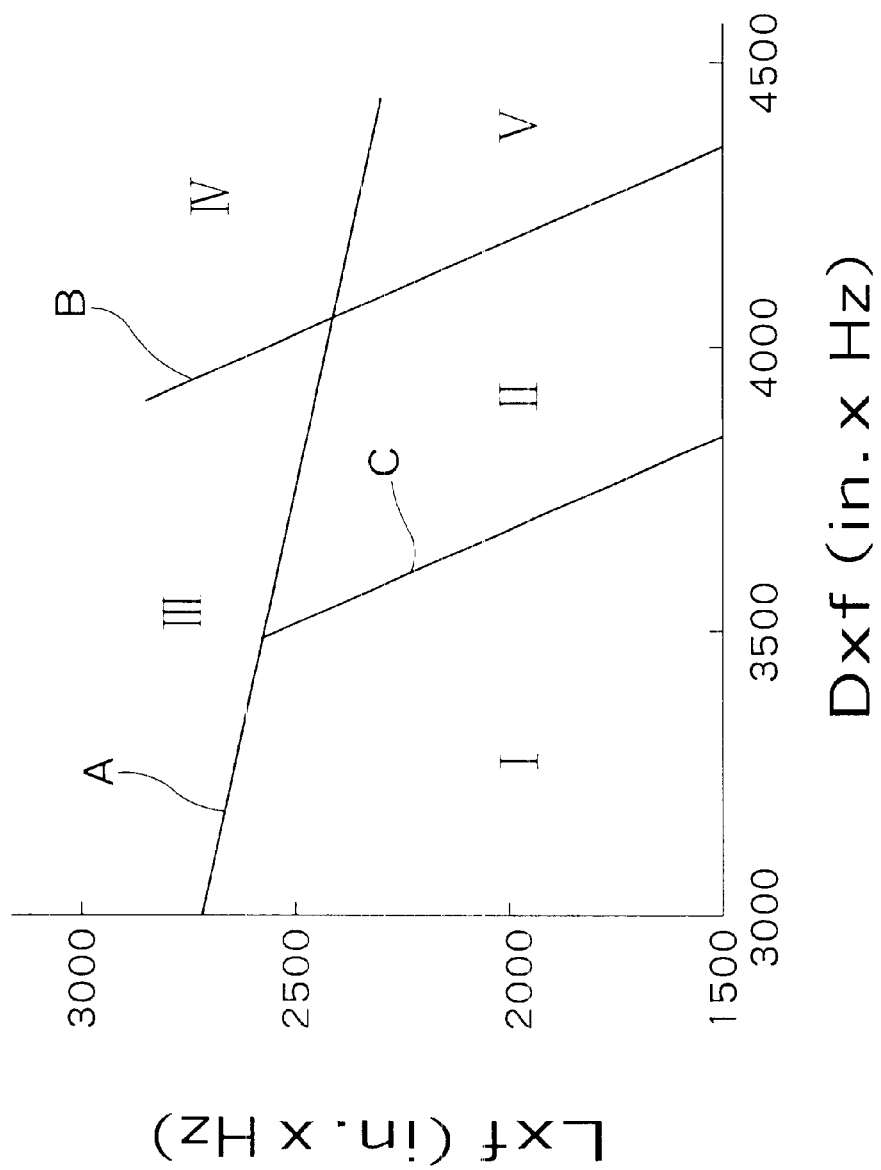
FIG. 5 is a graph defining possible regions for materials of moving blades and structure.

In FIG. 5, a line A indicates a limit of a range where the stress induced in the effective part or the dovetail of the moving blade does not exceed the strength of the material when the moving blade is formed of a steel. The line A is represented by the expression:

$$L \times (L+D) \times f^2 = 1.55 \times 10^7 \qquad (1)$$

A line B in FIG. 5 indicates a limit of a range where the rotor bore stress does not exceed the strength of the material when the moving blade is formed of a steel and the dovetail is a curved-axial-entry and has an Christmas-tree shape. The line B is represented by the expression:

$$(L+3D) \times f = 1.45 \times 10^4 \qquad (2)$$

A line C in FIG. 5 indicates a limit of a range where the rotor bore stress does not exceed the strength of the material when the moving blade is formed of a steel and the dovetail has a fork shape. The line C is represented by the expression:

$$(L+3D) \times f = 1.30 \times 10^4 \qquad (3)$$

Regions III and IV shown in FIG. 5 are represented by the expression:

$$L \times (L+D) \times f^2 \geq 1.55 \times 10^7 \qquad (4\text{-}1)$$

Region V shown in FIG. 5 is represented by the expression:

$$(L+3D) \times f \geq 1.45 \times 10^4 \qquad (4\text{-}2)$$

In these regions III, IV and V, the moving blade must be formed in a reduced weight in order to reduce centrifugal forces that act on the moving blade and the rotor wheel. To this end, the moving blade is formed of a titanium alloy, and the dovetail is of a curved-axial-entry-Christmas-tree design.

The dovetail 2 of the curved-axial-entry-Christmas-tree design is configured so that: as viewed in a radial direction of the rotor wheel 3, the dovetail 2 is curved to be convex toward an circumferential direction of the rotor wheel 3 in such a manner that the curve of the dovetail 2 is similar to that of the root of the effective part of the moving blade 1; and that the dovetail 2 has a plurality of hooks engaged with recesses of the dovetail slot which is substantially complementary with the dovetail 2, as schematically shown in FIG. 4A.

According to the curved-axial-entry-Christmas-tree design of the dovetail 2, since the volume of the dovetail 2 can be reduced, the total weight of the moving blade 1 can be reduced, and the thickness of the middle part of the rotor wheel 3 can be reduced, resulting in reduction in rotor bore stress.

Region II shown in FIG. 5 is represented by the following expresions:

$$1.45 \times 10^4 \geq (L+3D) \times f \geq 1.30 \times 10^4 \qquad (5)$$

and $$L \times (L+D) \times f^2 \leq 1.55 \times 10^7 \qquad (6)$$

In this region II, the moving blade may be formed of a steel, however, the curved-entry-Christmas-tree design must be used to reduce the total weight of the moving blade and the centrifugal force that acts on the rotor wheel.

When the moving blade has a long effective length, connection of all the adjacent moving blades of the stage is effective in reducing stress induced by vibration of the moving blades. In this embodiment, all the adjacent moving blades 1 are connected to each other, by the lug-and-sleeve connection and by the face-to-face contact between the adjacent snubber covers 4 (see FIG. 4A), thereby to form a continuous circumferential connection of the moving blades 1 that suppresses vibration of the moving blades 1. In addition, since the lugs 5 and sleeves 6 and the adjacent snubber covers 4 are capable of relative movement while being contacting to each other, friction between them suppresses vibration of the moving blades 1 to a satisfactorily low level.

Preferably, the contact surfaces of the snubber covers 4 are coated with tungsten carbide to enhance the abrasion resistance and fretting resistance of the contact surfaces. Thereby, the effect of the continuous circumferential connection of the moving blades, which attenuates primary vibrations that induce a high stress to the moving blades, is fully achieved.

The moving blades are not provided with any through holes for connecting the adjacent moving blades. Moreover, owing to the Christmas-tree dovetail design, the moving blades are not provided with any through holes, such as a hole for a fixing pin. Accordingly, the moving blades are highly reliable.

The further advantage of the curved-axial-entry-Christmas-tree design in combination with the continuous circumferential connection of the moving blades is that excessively high bending stress is not induced in the moving blade. This is because, the connection between the adjacent moving blades permits relative movement of the moving blades and thus does not restrain moving blades strongly from deformation, and the dovetail is not completely fixed to the dovetail slots (there exists a play between the dovetail and the dovetail slot), accordingly the moving blades assume respective attitude with respect to centrifugal force, independently.

The foregoing discussions relate to necessary conditions for the strength of the moving blade and can be satisfied by a moving blade designed by enlarging a conventional moving blade according to a desired blade length. However, if the moving blade is designed by simply enlarging the conventional moving blade, patch of the moving blades measured at the tips thereof increase and regular steam currents cannot be formed around the tips of the moving blades. Discussions regarding performance of the moving blades will be made hereinafter.

Figure 6:
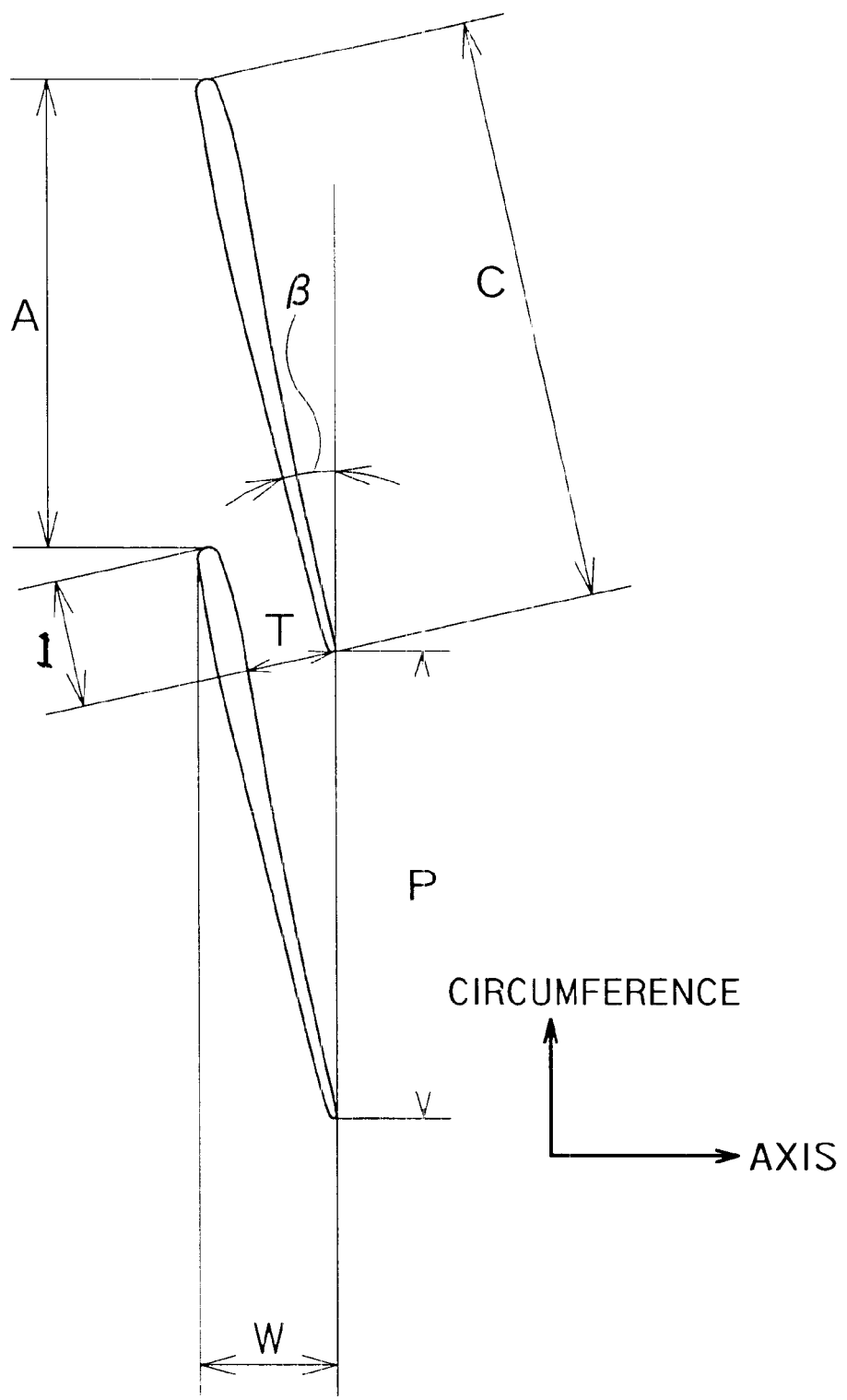
FIG. 6 is a top view of tip parts of moving blades.

FIG. 6 shows aerofoils or the tips of moving blades. Steam flow is dependent on the area of a steam passage, and the passage area of each height of the moving blade is dependent on the ratio T/P, where T is the width of a throat between the adjacent moving blades, and p is the pitch of the moving blades. To form the throat, the following must be satisfied:

$$l = C - P \times \cos \beta \leq C - P \times \sqrt{1-(T/P)^2} \leq () \quad (7)$$

thus, $$P/C \geq 1\sqrt{1-(T/P)^2} \quad (8)$$

where l is lapping length, C is the chord length of the moving blade, and β is the trailing edge end angle of the moving blade.

The ratio T/P is about 0.1 to about 0.3, the value of the right side of Expression (8) is in the range of 1.01 to 1.05. Thus, the ratio P/C must be 1.0 or less. The axial width W of the tip of the moving blade is expressed by the expression:

$$W = C \times \sin \beta \approx C \times (T/P) \quad (9)$$

A brief survey of parameters will be made. The foregoing general design uses the ratio T/P in the range of 0.1 to 0.3. Therefore, the chord length C can be determined approximately from P/C≦1.0 when the throat width T is decided. On the other hand, it is known from Expression (9) that the axial width W (the axial width W being a width of the moving blade measured along the circumferential direction of the rotor wheel) of the moving blade is in the range of 0.1 to 0.3 times the chord length C of the moving blade because the ratio T/P =0.1 to 0.3. Supposing that T is 1.0, W is about 0.9 to 1.0, and P/W is about 3.2 to about 10.8. Actually, it is preferable that 3.5 ≦P/W≦7.0 for the most efficient pitch-chord ratio (P/C) and the pitch-throatwidth ratio (P/T).

A moving blade meeting Expression (8) or (9) is capable of achieving desired performance. Since the moving blade of the present invention has a dovetail of a curved-axial-entry, there is a restriction on the arrangement of the moving blades on the rotor body. That is, the moving blades must be designed such that the adjacent moving blades do not interfere with each other when the moving blade is inserted in the curved dovetail slot of the rotor wheel.

Figure 7:
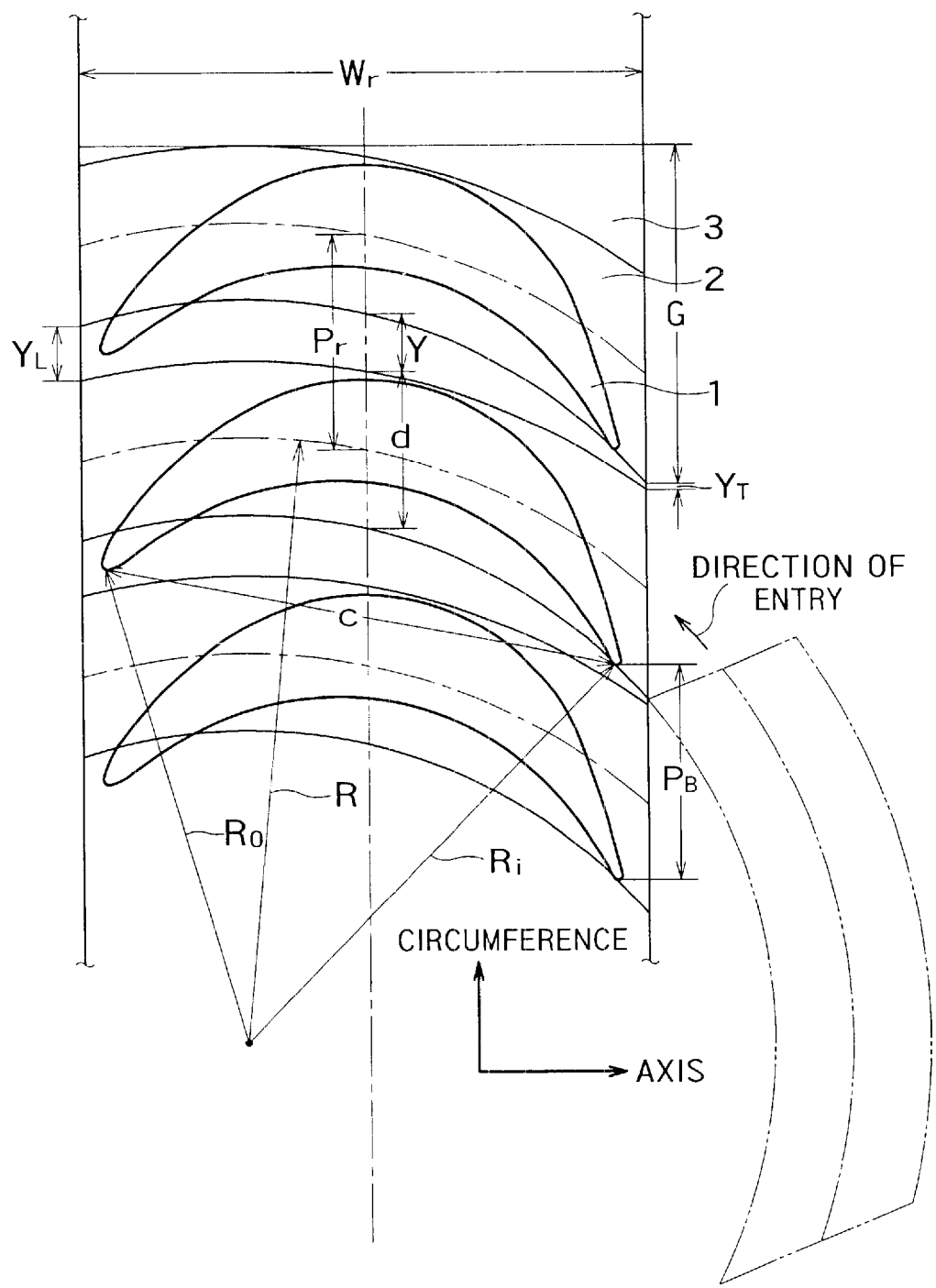
FIG. 7 is a development of a circumference of a rotor wheel as viewed from a radial direction of the rotor wheel.

FIG. 7 is a development of the rotor wheel 3, to which the moving blades 1 are mounted. FIG. 7 shows the dovetail 2 and the outer surface of the rotor wheel 3, as viewed from the radial direction of the rotor wheel 3. FIG. 7 also shows the cross-section (i.e., aerofoil) of the moving blades 1 at the roots of the moving blades 1. In FIG. 7, R indicates the radius of the center-line of the dovetail 2 (hereinafter referred to as "dovetail center radius"). The dovetail 2 of the moving blade is inserted in the dovetail slot along an arc with a radius R. Thus, in order to avoid the inserting moving blade 1 to collide with the adjacent moving blades 1, a circle with a radius $R_O$ having its center coinciding with that of the circle with the radius $R_1$ and including the leading edge of the blade, and a circle with a radius $R_1$ having its center coinciding with that of the circle with the radius R and including the trailing edge of the moving blade must not interfere with the adjacent moving blades.

A condition indicating whether or not the interference between the adjacent moving blades 1 occurs can be expressed by a function including the following parameters: the pitch of the moving blades 1; the chord length C of the moving blade 1; and the distances between the center line of the dovetail 1, and the leading edge and the trailing edge of the moving blade 1 mounted on the rotor wheel.

In order to decide strictly whether or not the interference between the adjacent moving blades 1 occurs, examinations must be made at some parts (e.g., tip, middle and root) of the moving blades 1. However, with good approximation, P/C≧0.8, where P/C is pitch-chord ratio at the tip of the moving blade 1, is the condition that enables assembly of the moving blades and the rotor wheel.

With respect to the above, the tip of the moving blades is preferably meet the condition: 0.8≦P/C≦1.0.

Next, the configuration of the dovetail 2 and the dovetail slot will be described with further reference to FIG. 7.

The meanings of the symbols shown in FIG. 7 are as follows:

Wr is a width of the dovetail 2 measured along the axial direction of the rotor wheel 3 (hereinafter referred to as "axial dovetail width");

d is a thickness of the dovetail 2 measured at the center of the dovetail with respect to the axial direction of the rotor wheel and along the circumferential direction of the rotor wheel 3 (hereinafter referred to as "circumferential dovetail thickness");

Pr is a pitch of the dovetails 2 (hereinafter referred to as "dovetail pitch");

Y is a distance between a contour of the dovetail 2 at the face side of one moving blade 1 and a contour of the dovetail at the back side of another moving blade 1 adjacent to said one moving blade 1, measured along the circumferential direction of the rotor wheel 3 (hereinafter referred to as "circumferential dovetail spacing"); and G is a width of the dovetail 2 as viewed from the axial direction of the rotor wheel 3 (hereinafter referred to as "circumferential dovetail width"), in other words, G is a maximum distance between a first line and a second line, the first line passing through a point on the contour of the dovetail 2 at the face side of the moving blade 1 and being parallel to the axis of the rotor wheel 3, the second line passing through a point on the contour of the dovetail 2 at the back side of the moving blade 1 and being parallel to the axis of the rotor wheel 3.

The circumferential dovetail spacing Y measured at the leading-edge-side end and the trailing-edge-side end of the dovetail 2 ($Y_L$ and $Y_T$) are smaller than the circumferential dovetail spacing Y measured at the center of the dovetail 2, which is equal to Pr−d. The difference between Pr−d, and $Y_L$ and $Y_T$ increases as the dovetail center radius R decreases. On the contrary, the circumferential dovetail width G decreases as the as the dovetail center radius R increases.

In order to increase the dovetail center radius R while maintaining the circumferential dovetail width G constant, the circumferential dovetail thickness d must be increased. In this case, the circumferential dovetail spacing Y at the leading-edge-side end and the trailing-edge-side end of the dovetail 2 ($Y_L$ and $Y_T$) decrease as the dovetail center radius R increases.

The circumferential dovetail thickness d relates with the maximum thickness of the root of the moving blade 1, and contributes to increasing section modulus related with stress induced in the root. Therefore, the circumferential dovetail thickness d must be equal to or more than a predetermined value $d_{min}$, which is dependent on the dimensions of the moving blade 1. The circumferential dovetail width G is dependent on the exit angle of steam, and must be equal to or more than a predetermined value $G_{min}$, which is dependent on the necessary strength of the dovetail 2.

Stress induced in the intermediate part between the adjacent dovetail slots of the rotor wheel 3 is substantially inversely proportional to the circumferential dovetail spacing Y. Therefore, the circumferential dovetail thickness d, the circumferential dovetail width G and the dovetail center radius R must be determined such that $1/(Pr-d)$ or $1/Y$ is minimized under restrictive conditions; $d \geq d_{min}$ and $G \geq G_{min}$, in order to avoid inducing excessive stress in the intermediate part between the adjacent dovetail slots of the rotor wheel 3.

Figure 8:
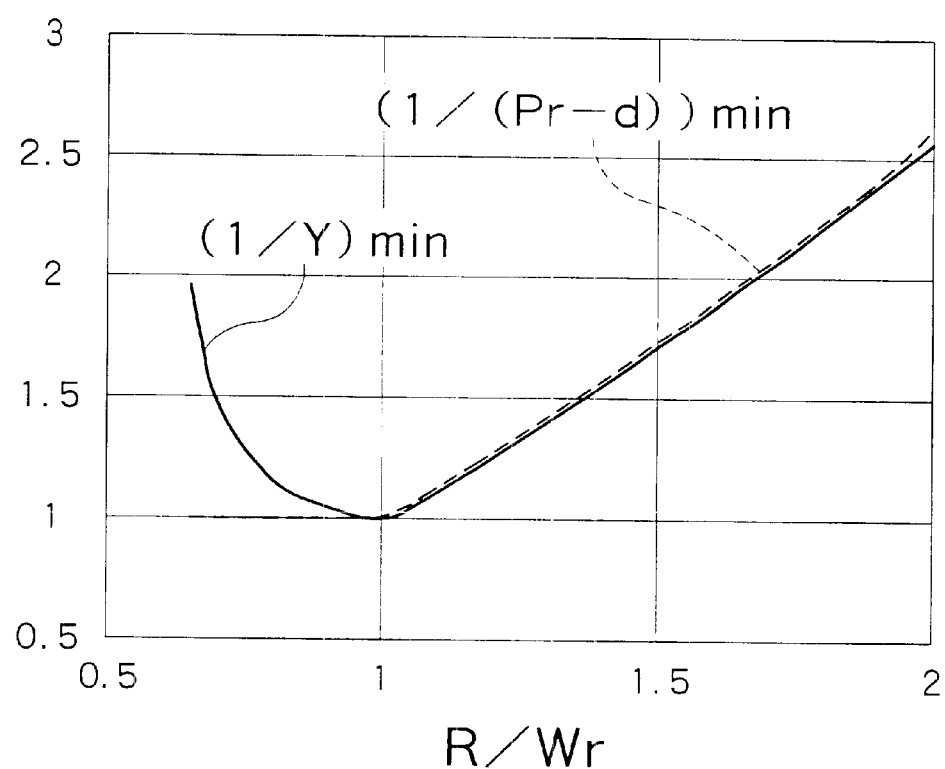
FIG. 8 is a graph showing the stress induced in a dovetail slot area of a rotor wheel with the radius of a dovetail slot.

FIG. 8 shows the variation of $1/(Pr-d)$ and $1/Y$ with the radius R. The minimum values $(1/(Pr-d))_{min}$ and $(1/Y)_{min}$ are bound by the restrictive condition $d \geq d_{min}$ in a range where the radius R is small, and are bound by the restrictive condition $G \geq G_{min}$ in a range where the radius R is large. The minimum value $(1/Y)_{min}$ increases sharply as the radius R decreases in a range where $R<0.8$ Wr. The minimum values $(1/(Pr-d))_{min}$ and $(1/Y)_{min}$ increase as the radius R increases in a range where $R>Wr$.

Thus, the radius R is preferably in the range of 0.8 Wr to 1.2 Wr where the minimum value $(1/Y)_{min}$ does not increase sharply.

Thus, $$0.8 < R/Wr < 1.2 \tag{10}$$

is preferable to provide a moving blade for the final-stage that induces a minimum stress in the intermediate part of the rotor wheel 3 between the adjacent dovetail slots.

Material forming a moving blade to be used in the foregoing high-stress field is an essential factor. When an $\alpha+\beta$-type titanium alloy, such as Ti-6Al-4V alloy, a most prevalently used titanium alloy, is used for forming the components of a turbine, a moving blade for a steam turbine meeting $L \times f \geq 2400$ can be obtained.

A near-$\beta$-type titanium alloy, such as Ti-10V-2Fe-3Al alloy or Ti-5Al-2Sn-2Zr-4Mo-4Cr alloy (Ti-17), is has a strength about 1.2 times greater than that of the $\alpha+\beta$-type titanium alloy and is suitable for forming a longer moving blade. The near-$\beta$-type titanium alloy has a property intermediate those of the $\alpha+\beta$-type and the $\beta$-type titanium alloy, and has a high specific strength and low deformation resistance when subjected to hot forging.

The moving blade formed of a steel must be capable of withstanding the stress induced therein by centrifugal force that acts thereon when the steam turbine is operated at a high rotating speed, and the stress induced therein by vibrations thereof caused by steam currents that act thereon. Therefore, the material of the moving blade must have a tensile strength and high-cycle fatigue strength sufficient to withstand those stresses related to the centrifugal forth and the vibrations. Steels having martensitic structure are preferable materials for forming the moving blade. Chromium is added to the steel to enhance the high-temperature strength and the high-temperature oxidization resistance of the steel. Preferably, the Cr content of the steel, as considered in connection with the contents of other elements, such as C, Mo and Ni, is in the range of 10 to 18 wt %.

Table 1 specifies the respective compositions of M152 and GTD450, examples of martensitic stainless steels. Values representing contents in Table 1 are expressed in percent by weight.

TABLE 1

|        | C        | Cr | Ni   | Mo   | Cu   | V   | Nb    |
|--------|----------|----|------|------|------|-----|-------|
| GTD450 | 0.05     | 15 | 6.5  | 0.75 | 1.5  | 0.1 | 8 × C |
| M152   | 0.1–0.17 | 12 | 2.75 | 1.75 | —    | 0.3 | —     |

Both M152 and GTD450 have sufficient strength exceeding a proof stress of 80 kg/mm², sufficient toughness and sufficient impact resistance value.

Figure 9:
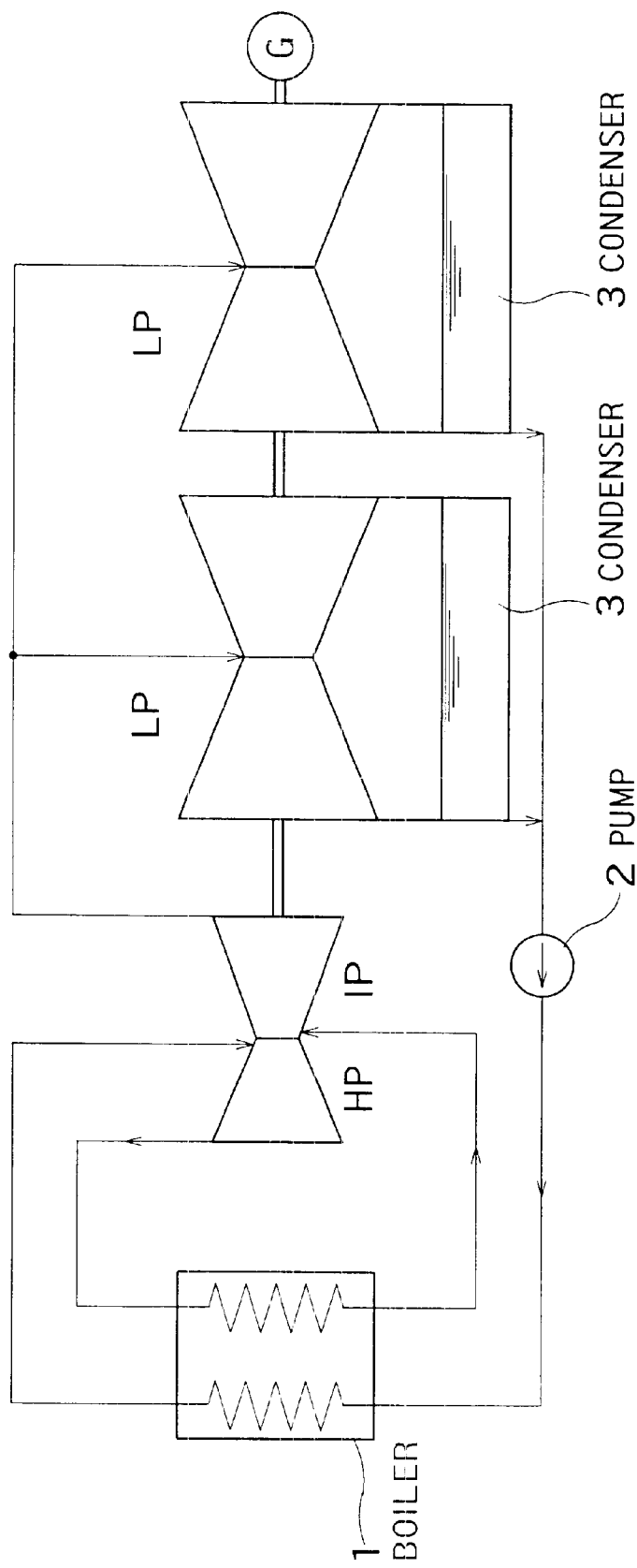
FIG. 9 is a typical view of a 60 Hz 1200 MW turbine provided with moving blades according to the present invention.

FIG. 9 shows a 60 Hz 1200 MW turbine having a low-pressure final-stage provided with the moving blades of the present invention. Since the annulus area of the final-stage is greater than that of a conventional, equivalent final-stage, the turbine needs two low-pressure turbine casings, while the conventional, equivalent turbine needs three low-pressure turbine casings. Thus, a high-performance turbine can be formed in compact construction.

Figure 10:
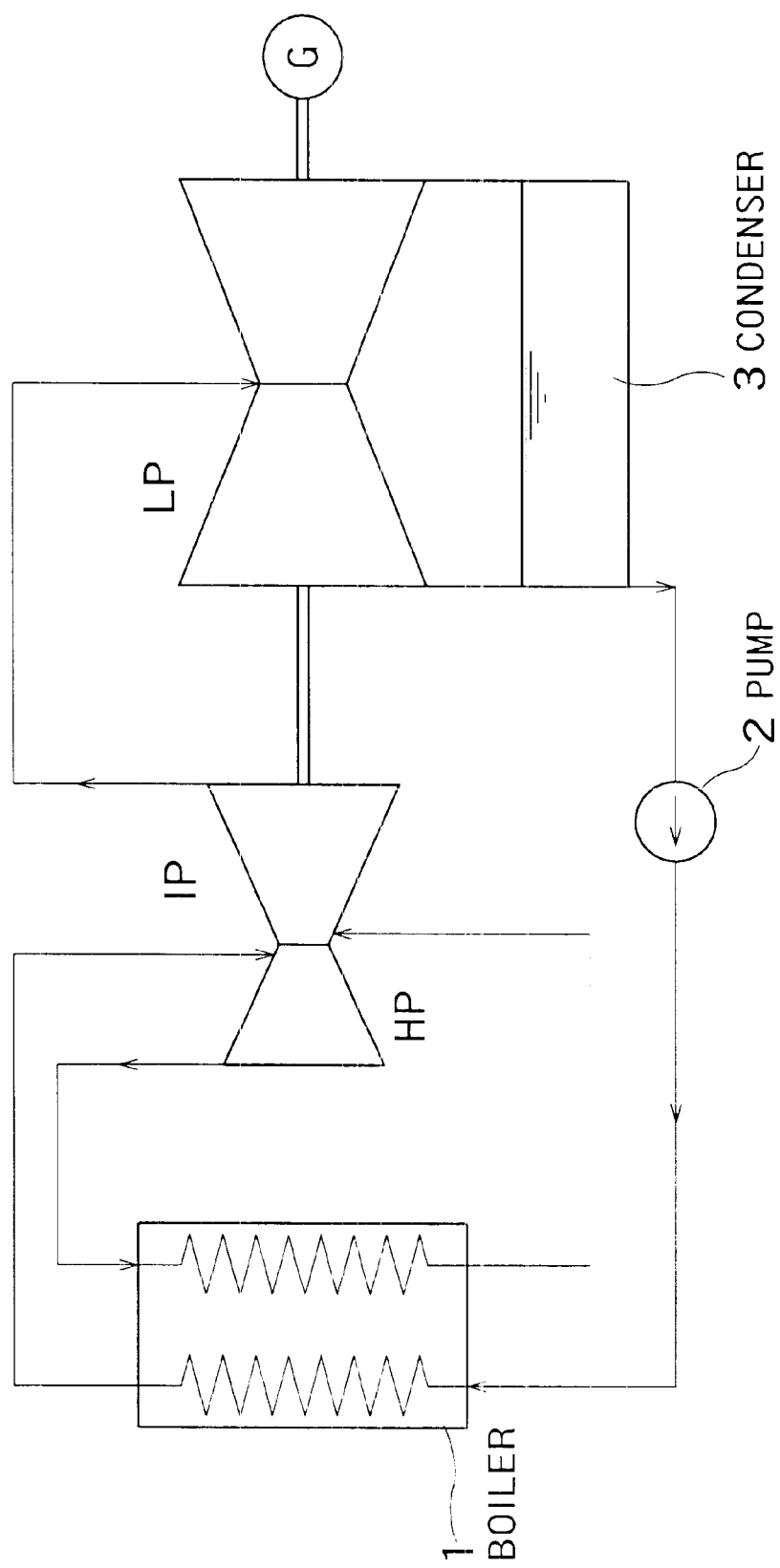
FIG. 10 is a typical view of a 50 Hz 1000 $\mu$M turbine or a 50 Hz 600 MW turbine provided with moving blades according to the present invention.

FIG. 10 shows a 50 Hz 1000 MW or a 50 Hz 600 MW turbine having the final-stage provided with moving blades of the present invention. Since the annulus area of the final-stage is greater than that of a conventional, equivalent final-stage, the turbine needs one low-pressure turbine casing, while the conventional, equivalent turbine needs two low-pressure turbine casings. Thus, a high-performance turbine can be formed in compact construction.

Figure 11:
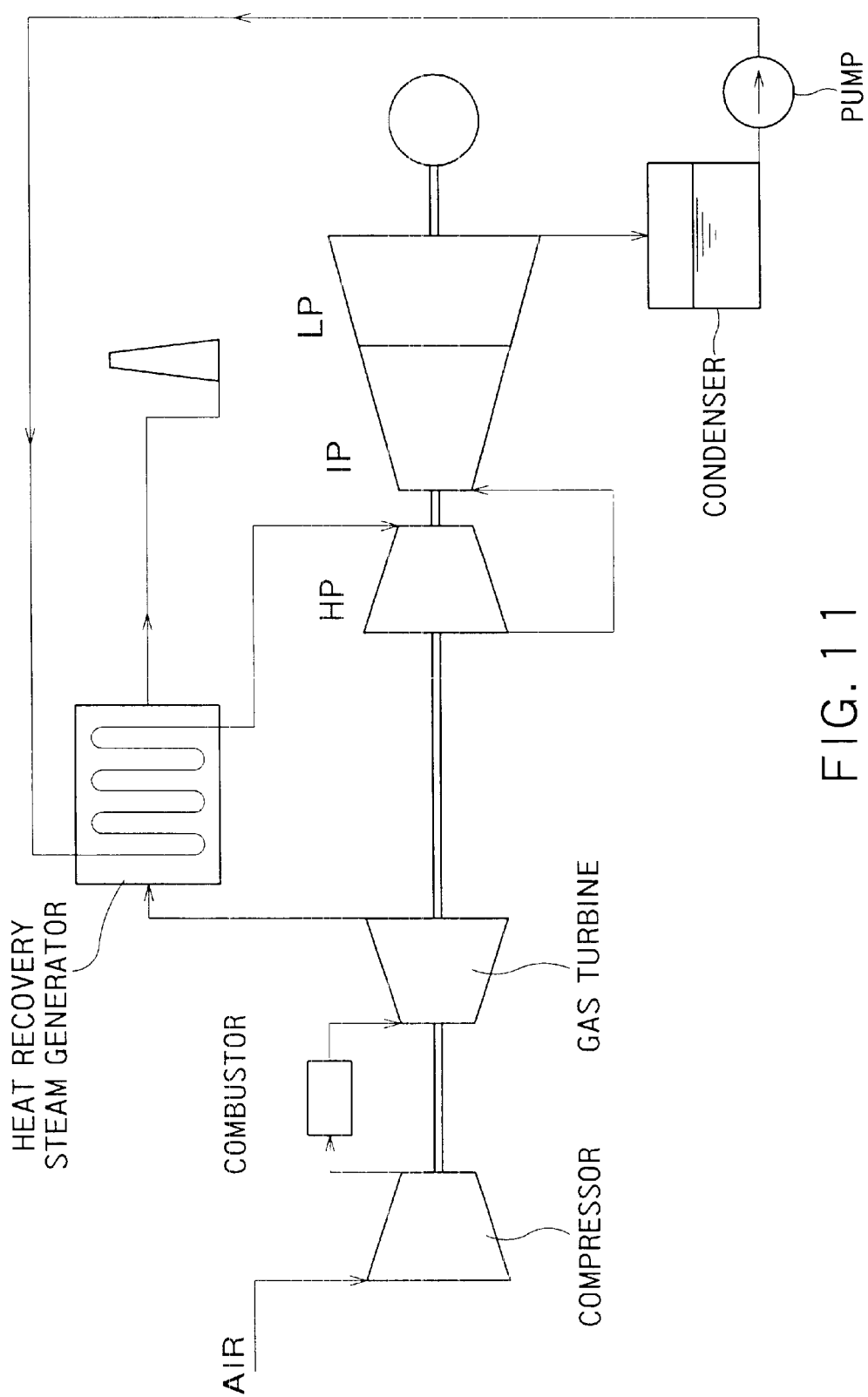
FIG. 11 is a typical view of a 60 Hz 400 MW combined-cycle plant including a turbine provided with moving blades according to the present invention.

FIG. 11 shows a 60 Hz 400 MW combined-cycle plant including a turbine having a low-pressure final-stage provided with moving blades of the present invention. Since the annulus area of the final-stage is greater than that of a conventional, equivalent final-stage, the turbine needs a single-flow low-pressure casing, while the conventional, equivalent turbine needs a double-flow low-pressure turbine casing.

What is claimed is:

1. A moving blade assembly for a stage of a low-pressure steam turbine having one of rated operating speeds of 50 Hz and 60 Hz, said assembly comprising:

a rotor wheel having dovetail slots; and a plurality of moving blades secured to the rotor wheel and arranged as an annular array circumferentially around the rotor wheel, each of the moving blades having dovetails inserted into each of the dovetail slots of the rotor wheel, wherein:

the moving blades are configured so as to meet one of the conditions: $(L+3D) \div f \geq 14,500$ and $L \times (L+D) \times f^2 1.55 \times 10^7$, where L is an effective length of the moving blade measured in inches, D is a blade root circle diameter of the moving blades measured in inches, and f is the rated operating speed of the turbine measured in Hz;

the moving blades are formed of a titanium alloy;

each of the dovetails has a Christmas-tree shape and is a curved-axial-entry;

the moving blades are configured and arranged so as to meet one of the conditions: $3.5P/W \leq 7\ 0$ and $0.8 \leq P/C$ 1.0, where W is a width of a tip of the moving blade measured along an axial direction of the rotor wheel, P is a pitch of the moving blades measured at the tips of the moving blades and C is a chord length measured at the tip of the moving blade; and all adjacent moving blades of said plurality of moving blades are connected to each other in such a manner that the adjacent moving blades being capable of relative movement with the adjacent moving blades being connected to each other.

2. The assembly according to claim 1, wherein the moving blades are formed of an $\alpha+\beta$-type titanium alloy when the moving blades meet a condition: $L \times f \geq 2400$.

3. The assembly according to claim 1, wherein the moving blades are formed of a near-$\beta$-type titanium alloy when the moving blades meet a condition: $L \times f \geq 2700$.

4. The assembly according to claim 1, wherein:

each of the moving blades has a snubber cover formed integrally with the moving blade; and the adjacent moving blades are connected to each other by contacting the snubber covers of the adjacent moving blades to each other in such a manner that the adjacent snubber covers are capable of relative movement while the adjacent snubber covers contacting to each other, and that the moving blades form a continuous ring around the rotor wheel.

5. The assembly according to claim 1, wherein:

each of the moving blades has a lug formed integrally with the moving blade at a middle portion of an effective part of the moving blade;

the adjacent moving blades are connected to each other by a lug-and-sleeve connection including a sleeve and the lug engaged with the sleeve, the connection allowing relative movement between the lug and the sleeve; and the lugs and the sleeves form a continuous ring around the rotor wheel.

6. The assembly according to claim 5, wherein the moving blade has no through holes formed therein.

7. The assembly according to claim 1, wherein the dovetail of each of the moving blades is configured so as to meet a condition: $0.8<R/Wr<1.2$, where R is a radius of a center line of the dovetail as viewed from a radial direction of the rotor wheel, and Wr is a width of the dovetail measured along the axial direction of the rotor wheel.

8. A moving blade assembly for a stage of a low-pressure steam turbine having one of rated operating speeds of 50 Hz and 60 Hz said assembly comprising:

a rotor wheel having dovetail slots; and a plurality of moving blades mounted to the rotor wheel and arranged as an annular array circumferentially around the rotor wheel, each of the moving blades having dovetails inserted into each of the dovetail slots of the rotor wheel, wherein:

the moving blades are configured so as to meet conditions: $1.45 \times 10^4 \geq (L+3D) \times f \geq 1.3 \times 10^4$ and $L \times (L+D) \times f^2 < 1.55 \times 10^7$, where L is an effective length of the moving blade measured in inches, D is a blade root circle diameter of the moving blades measured in inches, and f is the rated operating speed of the turbine measured in Hz;

the moving blades are formed of a martensitic stainless steel having a Cr content in a range of 10 to 18 wt %;

each of the dovetails has a Christmas-tree shape and is a curved-axial-entry;

the moving blades are configured and arranged so as to meet one of the conditions: $3.5 \leq P/W \leq 7.0$ and $0.8 \leq P/C$ 1.0, where W is a width of a tip of the moving blade measured along an axial direction of the rotor wheel, P is a pitch of the moving blades measured at the tips of the moving blades and C is a chord length measured at the tip of the moving blade; and all adjacent moving blades of said plurality of moving blades are connected to each other in such a manner that the adjacent moving blades being capable of relative movement with the adjacent moving blades being connected to each other.

9. The assembly according to claim 8, wherein:

each of the moving blades has a snubber cover formed integrally with the moving blade; and the adjacent moving blades are connected to each other by contacting the snubber covers of the adjacent moving blades to each other in such a manner that the adjacent snubber covers are capable of relative movement while the adjacent snubber covers contacting to each other, and that the moving blades form a continuous ring around the rotor wheel.

10. The assembly according to claim 8, wherein:

each of the moving blades has a lug formed integrally with the moving blade at a middle portion of an effective part of the moving blade;

the adjacent moving blades are connected to each other by a lug-and-sleeve connection including a sleeve and the lug engaged with the sleeve, the connection allowing relative movement between the lug and the sleeve; and the lugs and the sleeves form a continuous ring around the rotor wheel.

11. The assembly according to claim 10, wherein each of the moving blade has no through holes formed therein.

12. The assembly according to claim 8, wherein the dovetail of each of the moving blades is configured so as to meet a condition: $0.8<R/Wr<1.2$, where R is a radius of a center line of the dovetail as viewed from a radial direction of the rotor wheel, and Wr is a width of the dovetail measured along the axial direction of the rotor wheel.

* * * * *